(12) United States Patent
Schake

(10) Patent No.: US 6,227,192 B1
(45) Date of Patent: May 8, 2001

(54) HOT PLATE FOR CUPS AND RELATED ITEMS

(76) Inventor: Jay Schake, 142 Jennings Rd., Cartersville, VA (US) 23027

( * ) Notice: Subject to any disclaimer, the term of this patent is extended or adjusted under 35 U.S.C. 154(b) by 0 days.

(21) Appl. No.: 09/450,582

(22) Filed: Nov. 30, 1999

Related U.S. Application Data

(60) Provisional application No. 60/110,252, filed on Nov. 30, 1998.

(51) Int. Cl.$^7$ .................................... A47J 36/24
(52) U.S. Cl. ..................... 126/246; 126/258; 126/400
(58) Field of Search ................. 126/43, 39 F, 246, 126/261, 273.5, 376.1, 400, 46, 258

(56) References Cited

U.S. PATENT DOCUMENTS

| | | | | |
|---|---|---|---|---|
| 136,063 | * | 2/1873 | Janke | 126/46 |
| 230,199 | * | 7/1880 | Sawyer | 126/246 |
| 471,742 | * | 3/1892 | Busch | 126/43 |
| 914,828 | * | 3/1909 | Hamburger | 126/376.1 |
| 2,419,416 | * | 4/1947 | Mustain | 126/246 |
| 4,185,614 | * | 1/1980 | Egawa | 126/43 |
| 4,829,981 | * | 5/1989 | Burrell | 126/246 |

FOREIGN PATENT DOCUMENTS

673572 * 3/1990 (CH) .

* cited by examiner

*Primary Examiner*—Ira S. Lazarus
*Assistant Examiner*—Sara Clarke
(74) *Attorney, Agent, or Firm*—Sheldon H. Parker

(57) ABSTRACT

The device of the present invention is a stored heat warming utensil. It includes a heat storage element having a bottom surface and a top surface, a an outer container, and a vessel for a liquid, most typically a cup. The outer container has an opening in its top and an interior surface with a flange member for supporting the heat storage element. The heat storage member is positioned within the outer container and supported on said flange member. The drink vessel is dimensioned to be received within the outer container and be supported on the heat storage element. The outer container can be a ceramic member. A heat source, such as a candle can be provide d to provide continuing heat to the heat storage element. The heat source is positioned within the heat source retaining section, and is shielded from the user by said outer container. The heat storage device is a soft metamorphic rock composed primarily of mineral talc. It is common known as soapstone and steatite. Heat transfer from the heat storage element to the cup requires that the drink vessel have its bottom surface in thermal contact with said heat storage device. The contour of said drink vessel bottom surface and said heat storage device top surface are substantially the same, whereby said heat storage device and said drink vessel are in effective heat transfer contact over the major portion of the drink vessel bottom surface.

18 Claims, 3 Drawing Sheets

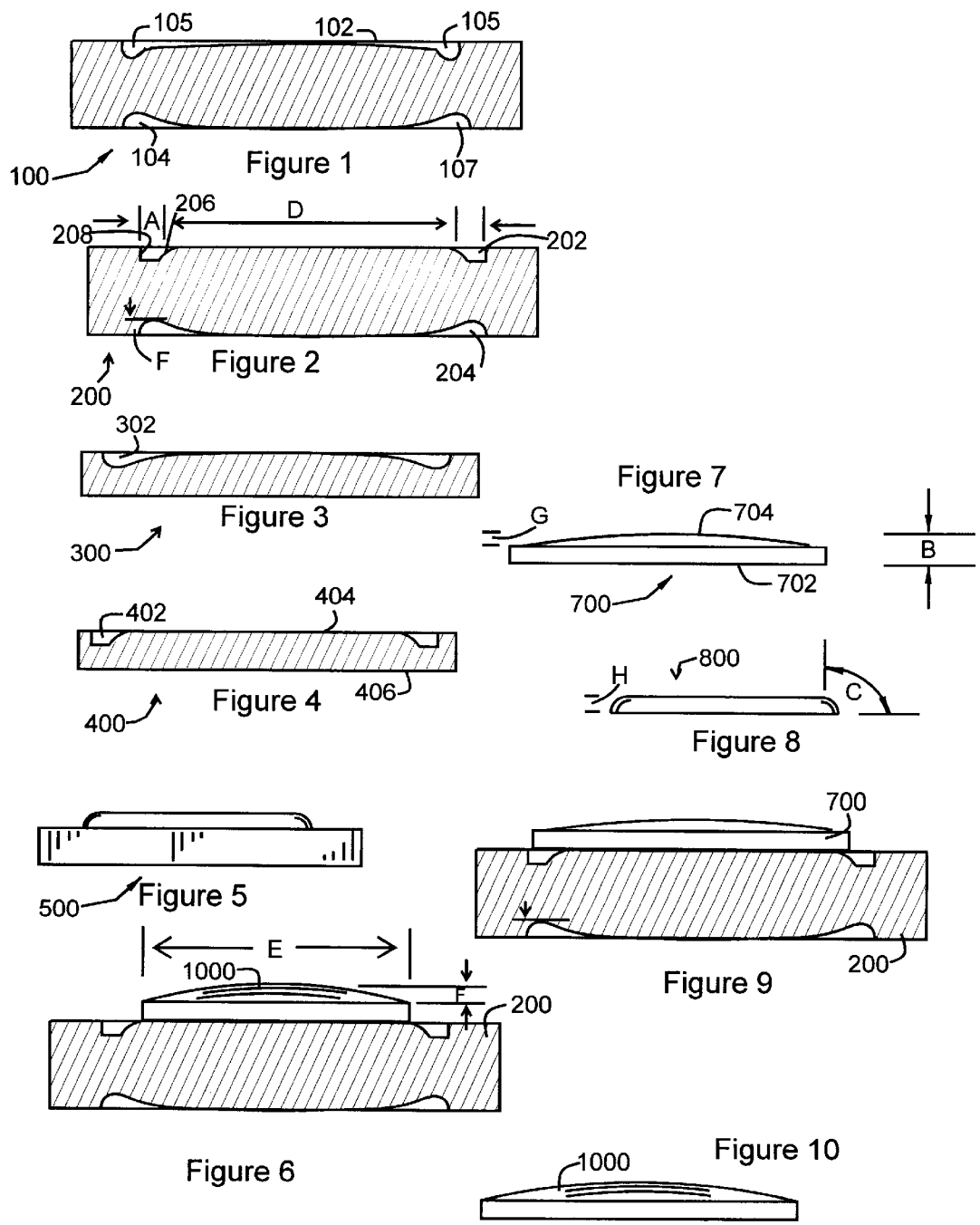

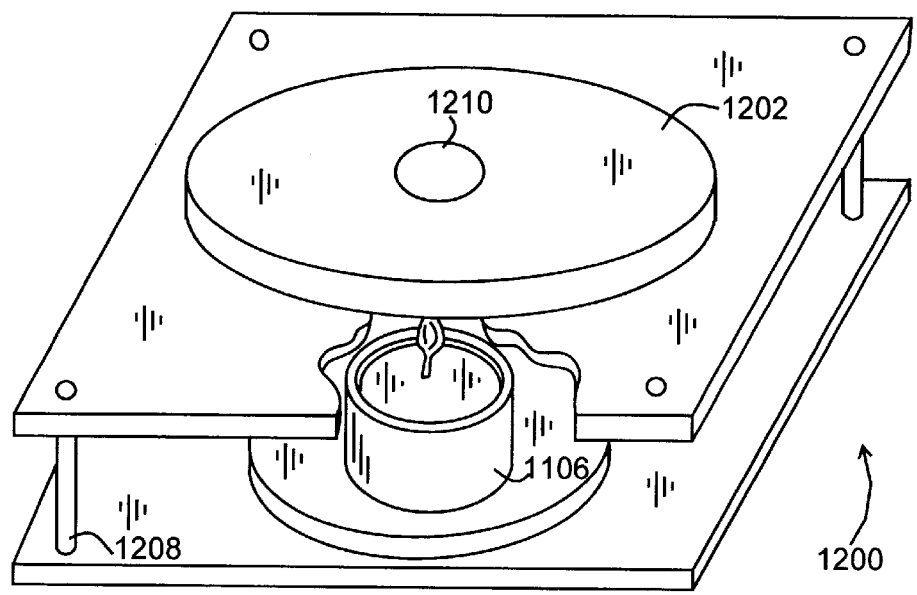
Figure 12
Figure 11
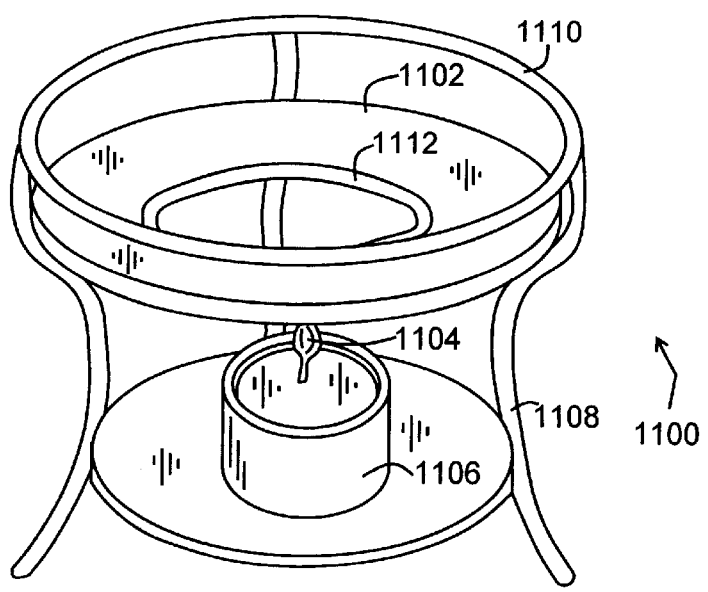

HOT PLATE FOR CUPS AND RELATED ITEMS

CROSS-REFERENCE TO RELATED PATENT APPLICATION

The present application claims the benefits under 35 U.S.C. 119(e) of provisional patent application Ser. No. 60/110,252, filed Nov. 30, 1998. This application incorporates by reference, as though recited in full, the disclosure of co-pending provisional patent application Ser. No. 60/110,252.

BACKGROUND OF THE INVENTION

1. Field of the Invention

This invention relates to hot plates, and more particularly, to a hot plate system that incorporates a natural or synthetic stone hot plate, and to a design where the heat source can be a flame source. The invention relates to stored heat device such as a stone that is positioned beneath a vessel such as a drinking cup, and heat is transferred from the stored heat device to the vessel to maintain the liquid in the vessel at an elevated temperature.

2. Brief Description of the Prior Art

Stored heat cooking vessels have been used for many years. They have been found to be particularly beneficial where a heating element such as a stone can be heated in a stove or on the campfire and the stored heat energy used to maintain foods at an elevated temperature or to slowly cook the food. U.S. Pat. No. 2,640,478, A. F. Flournoy, illustrates such a device. This consists of an outer container which has a heat storing element in its interior base and supports above it a cooking vessel having an enclosing lid. The vessel appears much like a double-boiler cooking pan with the heat element in the position of the water. U.S. Pat. No. 2,419,416 illustrates a holder and warmer for liquid containers using the same principles involved in the cooking vessel.

U.S. Pat. No. 4,258,695, entitled, Stored heat cooking utensil, discloses a stored heat cooking utensil which consists of an outer container, a cooking vessel, a heat storage element, a lid for enclosing the outer container and cooking vessel, a handle for manipulating the cooking vessel and the heat storage element, and a container handle which serves as a carrying handle for the cooking utensil and a lid securing device. The heat storage element is a disk of soapstone having a metal band around its exterior perimeter having its side perpendicular to the stone's top and bottom.

U.S. Pat. No. 4,806,738 discloses an electric plate, that is composed of soapstone. Soapstone is a greyish alteration product of species of rock containing very little silicon acid, including talcum and magnesite or dolomite. It can be readily machined, as well as enduring acids and alkalis and also heat to some extent.

The term "natural stone" is used in this specification and the appended claims to mean stone that occurs in the natural environment, as distinguished from synthetic or artificial stone-like materials manufactured by man, or other man-made imitation materials that are merely intended to have the appearance of stone. Examples of natural stone are natural granite, limestone, marble, serpentine stone, amphibole stone (such as hornblende), and soapstone.

BRIEF DESCRIPTION OF THE DRAWINGS

FIG. 1 is a cross-sectional side view of a hot plate in accordance with the present invention;

FIG. 2 is cross-sectional side view of another embodiment of a hot plate in accordance with the present invention;

FIG. 3 is a cross-sectional side view of further hot plate design in accordance with the present invention;

FIG. 4 is a cross-sectional side view of a still further hot plate design in accordance with the present invention;

FIG. 5 is a cross-sectional side view of still another hot plate design in accordance with the present invention;

FIG. 6 is a side view, partly in cross-sectional another embodiment of a hot plate design in accordance with the present invention;

FIG. 7 is a side view of a heat conductor element of the present invention;

FIG. 8 is a side view of another embodiment of a heat conductor element of the present invention;

FIG. 9 is a side view of the heat conductor element of FIG. 7, shown in combination with the hot plate element of FIG. 2;

FIG. 10 is a side view of a further heat conductor element of the present invention;

FIG. 11 is a perspective view of a hot plate element and support stand;

FIG. 12 is a perspective view of a hot plate element and another embodiment of a support stand;

SUMMARY OF THE INVENTION

Figure 13:
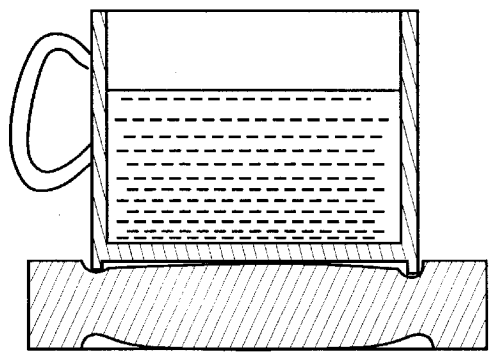
FIG. 13 is a side view, partly in cross section of a cup positioned on a warming element in accordance with the present invention.
Figure 14:
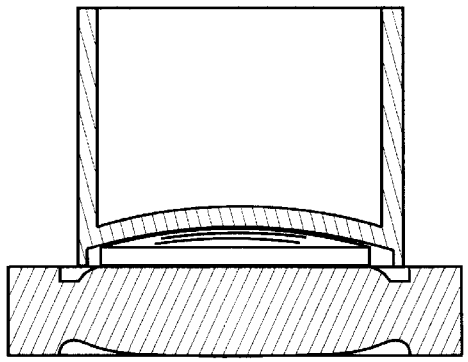
FIG. 14 is a side view, partly in cross section of a cup positioned on a different embodiment of a warming element in accordance with the present invention.

The device of the present invention is a stored heat warming utensil. It includes a heat storage element having a bottom surface and a top surface, an outer container, or support stand, and a vessel for a liquid, most typically a cup. The outer container has an opening in its top and an interior surface with a flange member for supporting the heat storage element. The heat storage member is positioned within the outer container and supported on said flange member.

The drink vessel has an opening in its top, and is dimensioned to be received within the outer container and supported on the heat storage element. Advantageously, the outer container has a protective ridge member at its upper end. The ridge member has a vertical length such that it extends above said heat storage element top surface and shields the heat element from the hand of a user.

Preferably, the outer container is a ceramic member, but it can also be a wire frame or metal member.

A heat source, such as a candle can be provided to provide continuing heat to the heat storage element. The outer container can have a plurality of side openings and a centrally positioned heat source retaining section. The heat source is positioned within the heat source retaining section, and is shielded from the user by said outer container. The heat storage device is a soft metamorphic rock composed primarily of mineral talc. It is common known as soapstone and steatite.

Heat transfer from the heat storage element to the cup requires that the drink vessel have its bottom surface in thermal contact with said heat storage device. The contour of said drink vessel bottom surface and said heat storage device top surface are substantially the same, whereby said heat storage device and said drink vessel are in effective heat transfer contact over the major portion of the drink vessel bottom surface.

Where the heat storage member has a flat heat transfer surface the drink vessel bottom surface must also be substantially flat. That is, the cup must not have a peripheral ridge, or a curved bottom surface.

Most typically, drink cup's bottom surfaces are concave and said heat storage device top surface is corresponding substantially curved.

The heat storage device can have a circular groove in its top surface to accommodate the drink vessel bottom surface peripheral ridge. The bottom surface peripheral ridge is positioned within the storage device circular groove. The drink vessel bottom surface is within said peripheral ridge and is in contact with the heat storage device top surface within said circular groove. ridge being positioned within said storage device circular groove and said drink vessel bottom surface within said peripheral ridge, is in contact with said heat storage device top surface within said circular groove.

DESCRIPTION OF THE PREFERRED EMBODIMENTS OF THE INVENTION

The invention relates to a novel hot plate, for use primarily with cups, though the uses can extend to other beverage or food containers.

The hot plate element indicated generally as 100, in FIG. 1, can be used in conjunction with a support stand, such as illustrated in FIGS. 11 and 12. The support stands which can be employed are of the type generally associated with Sterno type flame heaters or wax candle heaters for food and beverage warming. The heat source can be an oil burner, an electric resister heater, a gas burner, a microwave heater or an infra red heater. Where the heat source is a microwave, rather than a continuous heat source, the stone must be thicker in order to have a higher heat storage capacity.

The present invention departs from the standard technology in that it employs a high heat capacity natural or synthetic stone and most preferably, soapstone, but uses the material in a novel manner. It has been found that when attempting to use the system to warm cups, a problem is encountered. The majority of cups which are commercially available in the market place, do not have flat bottom surfaces. It has been found that the contact between the cup and the heated stone, is limited to the bottom rim of the cup. It has been further found, that the limited region of contact is insufficient for the hot plate to maintain the cup at the desired temperature. Thus, the system must be limited to use with flat bottomed cups.

It has been found that the problem of insufficient heat transfer can be economically overcome through the expediency of providing the stone with a groove region which conforms to the shape of the bottom surface of the cup, that is, the region within the bottom rim of the cup.

As shown in FIG. 1, a hot plate 100 can be provided with circularly grooved or recessed region 102 on one surface of the warming stone 100, and a similar, but differently contoured cup receiving recess 104 on the other side of the stone. By providing two different contour configurations, the single warming stone will have a region which is likely to conform to the bottom curvature of most cups. The end regions 105 and 107, of the recesses 102 and 104 respectively, are more deeply recessed that the central regions, in order to accommodate the outer, bottom rim or ridge which is frequently found on cups. Some cups are noted to have flat, ridgeless bottoms and will work well with planar surfaced warming plates.

FIG. 2 shows another combination of recesses. The grooves 202 are for use with cups that have flat bottoms and ridges, and the curved recess 204 can be used with cups that have curved bottoms and ridges. The width "A" of the circular groove 202 is dimensioned to correspond to the diameter and depth of typical cups. The width should be wide enough to accommodate a broad range of cup diameters. The diameter D, of the inner edge 206 of the groove should be small enough to accommodate small cups and correspondingly, the outer edge 208 of the groove 202 should be sufficiently large diameter to accommodate large cups. The same requirement is true for all of the grooves or recesses of the present invention.

FIG. 3 shows a recess 302 which can accommodate a ridged cup with a slightly curved bottom or relatively flat region between the peripheral ridge. A flat surface is provided to accommodate flat bottomed cups. It should be noted that a configuration such as shown in FIG. 2, where an annular groove 202 is provided, can accommodate both flat bottomed ridged and ridgeless cups.

FIG. 4 is an illustration of a cup warmer 400, which has a flat surface 404 and an annular groove 402. The opposite surface is flat to accommodate flat bottomed cups. FIG. 7 is an illustration of an adapter element which can be used in combination with a cup warmer, such as illustrated in FIGS. 1 through 4. The adapter element 700 has a flat surface 702 which mates with the flat region of a cup warmer, thus providing good heat transfer from the cup warmer to the adapter. The adapter 800 of FIG. 8 has a thickness H, which is sufficient to fit within the curve of the bottom of a cup and provide direct thermal contact, that is, conductive heat transfer, between the bottom curved wall of the cup and the cup warmer surface. FIG. 10 illustration another shape for an adapter 1000. FIG. 5 illustrates the adapter of FIG. 8 placed on a cup warmer. FIGS. 9 and 6, similarly show the combination of an adapter and a cup warmer.

FIG. 11 illustrates a stand which employs the cup warmer of the present invention. The stand 1100 has a plurality of legs, 1108, typically three or four, which are connected at their lower ends by a shelf and their upper ends by a rim 1110. The shelf also serves as a base for a heater unit, such as a candle or a Sterno heater. The flame 1104 heats the lower surface of the heat retention element 1102. The element 1102, preferably made of soapstone is provided with an annular groove 1112, as previously explained.

In the modification of FIG. 12, the support 1200 includes a pair of support elements, which are separated by vertical supports 1208, at each corner. The flame heater 1106 provides the heat for the warming plate 1202. The warming plate 1202 has a centrally positioned recess 1210 for mating with a non-flat bottomed cup.

EXAMPLE 1

A soapstone warmer is produced from a circular disk piece of soapstone having a diameter of six inches. The soapstone has a thickness of about one half inch.

An annular groove having an inner diameter of two and one half inches and an outer diameter of four inches, is cut one quarter of an inches into a planar surface of the soapstone.

The soapstone is supported on a frame at a height sufficient to accommodate a can of Sterno brand of flame heat source material. The stone is heated by the open flame and becomes warm to the touch. A cup having a three inch outside diameter, a one eighth inch by one eighth inch ridge and a curved radius from the bottom of the ridge to the bottom outer surface of the cup. The cup has a very shallow domed bottom surface with a diameter of about two and one quarter inches. The cup beverage was initially heated to moderately hot temperature. The cup was positioned on the warmer such that the bottom of the cup is in contact with the region of the warmer outlined by the groove. The beverage is found to maintain the beverage temperature for an extended period of time.

In another embodiment, the soapstone is the same as described above, except that it is one quarter inch thick. The lesser thickness works well with a continual heating element, such as a candle.

EXAMPLE 2

The soapstone was reversed on the frame, so as to present the planar surface to the cup. The cup with the heated beverage is placed on the stone. The bottom of the cup is found to make contact with the soapstone only through the ridge of the cup. The soapstone is not heated as previously described. The beverage is found to fail to maintain the beverage temperature for as long a period as previously noted.

The soapstone was reversed on the frame, relative to its position in Example 1, so as to present the planar surface to the cup. The soapstone is heated as previously described. The cup with the heated beverage is placed on the stone. The bottom of the cup is found to make contact with the soapstone only through the ridge of the cup. The beverage is found to fail to maintain the beverage temperate for as long a period as previously noted for Example 1, but for a greater time period than is achieved with an unheated stone.

EXAMPLE 3

A soapstone warmer is produced from a circular disk piece of soapstone having a diameter of six inches. The soapstone has a thickness of about one half inch.

An annular groove having an inner diameter of two and one half inches and an outer diameter of four inches, is cut one quarter of an inches into a planar surface of the soapstone. The region of the soapstone within the annular groove is shaped to provide a slightly rounded surface, which conforms to the shape of the bottom surface of the cup of Example 1.

The soapstone is supported on a frame at a height sufficient to accommodate a can of Sterno brand of flame heat source material. The stone is heated by the open flame and becomes warm to the touch. A cup having a three inch outside diameter, a one eighth inch by one eighth inch ridge and a curved radius from the bottom of the ridge to the bottom outer surface of the cup. The cup has a very shallow domed bottom surface with a diameter of about two and one quarter inches. The cup beverage was initially heat to moderately hot temperature. The cup was positioned on the warmer such that the domed bottom of the cup is in close contact with the correspondingly domed region of the warmer outlined by the groove. The beverage is found to maintain the beverage temperature for a greater time period than is attained with the structure of Example 1.

It is noted that the indentation in the bottom of cups can vary from about 1/8 to about 1/4 of an inch. Having a groove which is greater in depth than the recess is not a problem, but having a groove which is of insufficient depth to accommodate the recess, can be a problem, if the result is that the recessed bottom does not come extremely close to, or firmly contact the heated material.

Figure 15:
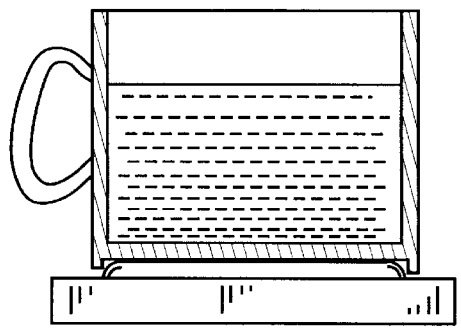
FIG. 15 is a side view, partly in cross section of a cup positioned on a further warming element in accordance with the present invention.
Figure 16:
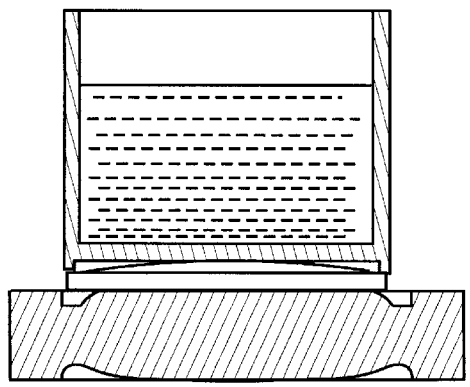
FIG. 16 is a side view, partly in cross section of a cup positioned on another warming element in accordance with the present invention.

In another application, the heated stone can be used without any accessory member, or can be used with a material which would keep the stone out of direct contact with the table top surface. Thus, a coaster, such as a disk, plate, or small mat can be placed under the heated stone to protect a table top or other surface beneath. The coaster can be a piece of wood which is grooved to accommodate the heated stone, or can simply be a flat member. The side appearance of the coaster and stone can be as shown in FIGS. 5 and 15. The recess in the coaster would have any convenient depth and would have a diameter at least slightly greater than the diameter of the stone. Obviously, if the stone were not of circular configuration, the recess is of a size and shape to accommodate the stone.

What is claimed is:

1. A stored heat warming utensil comprising:
   (a) a support stand, said support stand having an opening in its top, an interior surface with a flange member for supporting a heat storage element and at least one side opening;
   (b) a heat storage element having a bottom surface and a top surface, said heat storage element being positioned within said support stand and supported on said flange member;
   (c) a protective ridge member at said support stand top, said ridge member having a vertical length such that it extends above said heat storage element top surface and shields said heat storage element from the hand of a user;
   (d) a centrally positioned heat source retaining section, said heat source retaining section being shielded from the user by said support stand;
   (e) a heat source, said heat source being positioned within said heat source retaining section; and
   (f) a drink vessel, said drink vessel having an opening in its top and being dimensioned to be received within said protective ridge member adjacent said heat storage element.

2. The stored heat warming utensil of claim 1, wherein said support stand is a ceramic member.

3. The stored heat warming utensil of claim 1, wherein said heat source is a candle and said at least one side opening is an air vent.

4. The stored heat warming utensil of claim 1, wherein said heat storage element is a soft metamorphic rock composed of mineral talc.

5. The stored heat warming utensil of claim 4, wherein said heat storage element is soapstone.

6. The stored heat warming utensil of claim 4, wherein said heat storage element is steatite.

7. The stored heat warming utensil of claim 1, wherein said drink vessel has its bottom surface in thermal contact with said heat storage element and the contour of said drink vessel bottom surface and said heat storage element top surface are substantially the same, whereby said heat storage element and said drink vessel are in heat transfer contact over a major portion of said drink vessel bottom surface.

8. The stored heat warming utensil of claim 7, wherein said drink vessel bottom surface and said heat storage element top surface are substantially flat.

9. The stored heat warming utensil of claim 7, wherein said drink vessel bottom surface and said heat storage element top surface are substantially curved.

10. The stored heat warming utensil of claim 7, wherein said heat storage element has a circular groove in its top surface and said drink vessel bottom surface has a peripheral ridge, said bottom surface peripheral ridge being positioned within said storage element circular groove, thereby placing said drink vessel bottom surface, within said peripheral ridge, in contact with said heat storage element top surface within said circular groove.

11. The stored heat warming utensil of claim 10, wherein said drink vessel bottom surface within said peripheral ridge is concave, and said heat storage element top surface within said circular groove is convex.

12. A stored heat warming utensil comprising:
  (a) a heat storage element having a bottom surface and a top surface;
  (b) an outer container, said outer container having
    an opening in its top,
    an interior surface with a flange member for supporting the heat storage element, said flange member being positioned within said outer container and dimensioned to support said heat storage element,
    a base member, said base member being a spacer between said heat storage element and a lowermost surface of said outer container, such that said heat storage element is thermally separated from a support surface on which said utensil is supported;
    a centrally positioned heat source retaining section, said heat source retaining section being shielded from the user by said outer container,
    a heat source, said heat source being positioned within said heat source retaining section,
  (c) a vessel, said vessel having an opening in its top and being dimensioned to be received on said heat storage element within said outer container;
    whereby when said vessel having a bottom surface contour substantially the same as said heat storage element top surface, is placed in said stored heat warming utensil said vessel and said heat storage element are in heat transfer contact over a major portion of said vessel bottom surface.

13. The heat warming utensil of claim 12, wherein said outer container is a ceramic member.

14. The heat warming utensil of claim 12, wherein said heat storage element is a soft metamorphic rock composed of mineral talc.

15. The heat warming utensil of claim 14, wherein said vessel bottom surface and said heat storage element top surface are substantially flat.

16. The heat warming utensil of claim 14, wherein said vessel bottom surface and said heat storage element top surface are substantially curved.

17. The heat warming utensil of claim 16, wherein said heat storage element has a circular groove in its top surface and said vessel bottom surface has a peripheral ridge, said bottom surface peripheral ridge being positioned within said storage element circular groove and said vessel bottom surface within said peripheral ridge, is in contact with said heat storage element top surface within said circular groove.

18. The heat warming utensil of claim 16, wherein said vessel bottom surface within said peripheral ridge is concave, and said heat storage element top surface within said circular groove is convex.

* * * * *